US010659962B2

(12) United States Patent
Coughlin et al.

(10) Patent No.: US 10,659,962 B2
(45) Date of Patent: *May 19, 2020

(54) WIRELESS SESSION CONFIGURATION PERSISTENCE

(71) Applicant: Time Warner Cable Enterprises LLC, St. Louis, MO (US)

(72) Inventors: Brian Coughlin, Reston, VA (US); John A. Chen, Ashburn, VA (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 3 days.

This patent is subject to a terminal disclaimer.

(21) Appl. No.: 15/882,827

(22) Filed: Jan. 29, 2018

(65) Prior Publication Data
US 2018/0152843 A1    May 31, 2018

Related U.S. Application Data

(63) Continuation of application No. 14/583,872, filed on Dec. 29, 2014, now Pat. No. 9,883,391, which is a
(Continued)

(51) Int. Cl.
*H04W 12/06* (2009.01)
*H04L 29/06* (2006.01)
(Continued)

(52) U.S. Cl.
CPC ........... *H04W 12/06* (2013.01); *H04L 63/083* (2013.01); *H04L 63/0853* (2013.01); *H04W 8/18* (2013.01);
(Continued)

(58) Field of Classification Search
None
See application file for complete search history.

(56) References Cited

U.S. PATENT DOCUMENTS 6,961,762 B1    11/2005    Yeap et al.
7,693,516 B2 *  4/2010    Hundal ............... H04L 63/0428
                                                        455/435.1
(Continued)

FOREIGN PATENT DOCUMENTS

EP          1770940 A1      4/2007
WO    WO 2012/145004 A1 * 10/2012  ............. G06Q 30/00

OTHER PUBLICATIONS

IEEE: "Part 11: Wireless LAN Medium Access Control (MAC) and Physical Layer (PHY) Specifications Sponsored by the LAN/MAN Standards Committee Amendment 9: Interworking with External Networks", IEEE 802.11U-2011, Feb. 25, 2011, Abstract Only.
(Continued)

*Primary Examiner* — Christopher A Revak
(74) *Attorney, Agent, or Firm* — Armis IP Law, LLC (57) ABSTRACT

A wireless access point employs a wireless configuration database for retrieving a stored wireless profile corresponding to a subscriber device from a remote location that enables the user to establish an Internet connection using their subscriber device with the same network identifiers and settings employed from the home wireless profile. The network identifier is typically an SSID (Service Set Identification), and labels the wireless configuration using a mnemonic name familiar to the user. The wireless configuration also denotes authentication and security (passphrase) tokens required for access, and would therefore enable the user to sign on at the remote wireless access point using the passphrase already known from their home WiFi arrangement. Subsequent attempts automatically establishing a connection to the subscriber device upon detection and authentication using the retrieved wireless profile without broadcasting an open SSID receivable by other wireless devices within range.

11 Claims, 9 Drawing Sheets

Related U.S. Application Data continuation of application No. 13/491,581, filed on Jun. 8, 2012, now Pat. No. 8,938,785.

(51) Int. Cl.
  *H04W 84/12* (2009.01)
  *H04W 8/18* (2009.01)
  *H04W 8/26* (2009.01)
  *H04W 48/08* (2009.01)

(52) U.S. Cl.
  CPC ............. *H04W 8/26* (2013.01); *H04W 48/08* (2013.01); *H04W 84/12* (2013.01)

(56) References Cited

U.S. PATENT DOCUMENTS

| | | | |
|---|---|---|---|
| 7,903,817 B2 | 3/2011 | Cam-Winget et al. | |
| 8,265,621 B2 | 9/2012 | Kopikare et al. | |
| 8,527,938 B2 | 9/2013 | Bahrami et al. | |
| 8,904,013 B2* | 12/2014 | Papakipos | H04W 76/11 709/227 |
| 8,913,959 B1 | 12/2014 | Pochop, Jr. | |
| 8,938,785 B2 | 1/2015 | Coughlin et al. | |
| 9,883,391 B2* | 1/2018 | Coughlin | H04W 12/06 |
| 2003/0233458 A1 | 12/2003 | Kwon et al. | |
| 2007/0208937 A1 | 9/2007 | Cam-Winget et al. | |
| 2010/0111057 A1 | 5/2010 | Nakamura et al. | |
| 2010/0217881 A1* | 8/2010 | Iino | H04W 12/06 709/229 |
| 2010/0254358 A1 | 10/2010 | Huang et al. | |
| 2011/0252240 A1* | 10/2011 | Freedman | H04L 63/02 713/169 |
| 2011/0312365 A1 | 12/2011 | Hatano et al. | |
| 2012/0257536 A1 | 10/2012 | Kholaif et al. | |
| 2013/0005386 A1 | 1/2013 | Kopikare et al. | |
| 2013/0031258 A1 | 1/2013 | Mukai et al. | |
| 2013/0198383 A1* | 8/2013 | Tseng | H04L 63/102 709/225 |
| 2014/0007200 A1* | 1/2014 | Zisimopoulos | H04L 63/102 726/4 |
| 2016/0156607 A1* | 6/2016 | Kim | H04L 63/08 726/7 |
| 2017/0374071 A1* | 12/2017 | Visuri | H04W 12/06 |
| 2018/0101699 A1* | 4/2018 | Pollari | G06Q 30/02 |

OTHER PUBLICATIONS

International Search Report for PCT/US2013/042839, dated Jul. 29, 2013, 3 pages.

Shenoy, Nirmala, "A Framework for Seamless Roaming Across Cellular and Wireless Local Area Networks", IEEE Wireless Communications, Jun. 2005, pp. 50-57, vol. 12, Issue 3, IEEE, USA.

Supplementary European Search Report, EP 13 80 0421, dated Dec. 15, 2015, pp. 7.

* cited by examiner

WIRELESS SESSION CONFIGURATION PERSISTENCE

RELATED APPLICATIONS

This application is a continuation of U.S. patent application Ser. No. 14/583,872, filed Dec. 29, 2014, which is a continuation of U.S. patent application Ser. No. 13/491,851 entitled "Wireless Session Configuration Persistence", filed on Jun. 8, 2012, the entire teachings of which are incorporated herein by this reference.

BACKGROUND

The recent proliferation of personal wireless devices has resulted in a corresponding influx of so-called "WiFi Hotspots"—Internet access for wireless devices from public and/or common locations, most notable from beverage and snack vendors, hotels, mass transit, and other retail and/or service vendors that offer such access as an incentive to frequent the vendor. Further, Internet browser capability is becoming increasingly common in smaller and more portable device, such as laptops, smartphones, and tablet devices that permit the user to invoke a browser and access Internet resources from the plethora of WiFi hotspots available. Such capability is enabled by the IETF 802.11a/b/g/n wireless LAN standard, which standardizes the consumer and home wireless networking capabilities (e.g. WiFi) among the various devices and allows for Internet connectivity at remote locations using consumer level devices.

SUMMARY

A wireless access point employs a wireless configuration database for retrieving a stored wireless profiles, with each profile corresponding to a subscriber device from a remote location that enables the user to establish an Internet connection using their subscriber device with the same network identifiers and settings employed from that user's home wireless profile. The network identifier is typically an SSID (Service Set Identification), and labels the wireless configuration using a mnemonic name familiar to the user. The wireless configuration also denotes authentication and security (passphrase) tokens required for access, and would therefore enable the user to sign on at the remote wireless access point using the passphrase already known from their home WiFi arrangement.

In a wireless services environment, a home customer ("User" or "Subscriber") of a broadband Internet Service Provider ("ISP"), often implements a home WiFi network to provide Internet service to one or more of their devices (subscriber devices) in a home (i.e. residence) environment. Configurations herein disclose a wireless access point whereby the ISP is entrusted with the user's home WiFi configuration credentials (credentials, or wireless profile) configured on their home WiFi Access Point ("AP") device, i.e. the user's SSID, security method, and passphrase.

Specifically, this approach defines a method to utilize each user's home (personal) parameters such that they are emulated on ISP-operated WiFi APs outside the user's home, in order to support just-in-time discovery, selection and provisioning of public WiFi Internet service via distribution of WiFi roaming profile(s). Each roaming profile may be unique to each user depending on what service plan(s) or subscribed feature(s) they may have with their ISP. As such, the roaming profiles can then be used to tailor the public WiFi service to each user independently and examples of such wireless profiles are described in more detail below.

The subscriber devices employing wireless network capabilities, commonly referred to as "WiFi," typically broadcast a probe to WiFi conversant devices, and receive a reply from wireless access points (APs) within range. The reply indicates the SSIDs available for connection, and conventional approaches employ the SSID set by the establishment. Such probes identify the subscriber device by MAC ID (Media Access Control Identifier), and are instead employed as an index to access the home or personal wireless profile in the wireless configuration data base so that the subscriber device will render the same SSID known to the user from their home configuration when attempting to connect from the remote location.

Configurations herein are based, in part, on the observation that various WiFi establishments employ differing sign-on procedures and typically assign each user to a standard default session profile that has settings and characteristics of the establishment, not the user. An authentication procedure is often employed, possibly with a passphrase or other token, to prevent unauthorized usage of the WiFi signal from the establishment or business. The authentication defines a particular type of encryption and/or authentication underlying the session, and assigns the user to a default session, which may have other properties and attributes set by the establishment.

In contrast, home WiFi usage is supported by a wireless access point within the dwelling using a wireless profile often saved from previous sessions. A user knows the identity of their wireless access point—labeled with an SSID—so they may attempt to connect to their wireless access point, rather than a neighbor's which may be within range and be recognized by the wireless device as a potential connection source.

Unfortunately, conventional approaches to public or common area WiFi establishments suffer from the shortcoming that wireless session establishment with a remote wireless access point at a remote location is presented with an unfamiliar list of SSIDs corresponding to wireless profiles established by the vendor or proprietor of the remote location. Users must manually identify the SSID and any credentials (e.g. passphrase) required, typically by inquiring or registering with the vendor or proprietor.

Accordingly, configuration herein substantially overcome the above describe shortcomings of conventional common-area WiFi arrangements by providing a wireless access point having an interface to a wireless configuration database that stores wireless profiles of subscribers according to MAC IDs or other identifiers that are employed to recognize the subscriber device and perform a lookup in the database from the remote wireless access point. In this manner, the subscriber enjoys the same user experience in establishing an Internet connection from a remote WiFi hotspot that they are accustomed to from their home wireless configuration.

In contrast to conventional approaches for WiFi Profile definition and distribution, the disclosed approach differs because the ISP Public Access point emulates the User's Home Access Point (via the "User WiFi Credentials") such that the User's device(s) will automatically connect via the retrieved wireless profile. Furthermore, this automatic connection is also a trusted one to the ISP, and facilitates the distribution of a public WiFi profile that the user can install for ongoing connections to the ISP public access point on a more permanent basis. While the most streamlined implementation is afforded when the home ISP and the ISP supporting the remote wireless access point are the same entity, various database security and authentication mechanisms may be employed to provide a more global database of user credentials across multiple vendors.

Configurations herein therefore provide more streamlined, trusted customer access to ISP's public WiFi service outside of the home. The approach is facilitated by greater trust established between user and ISP because user's home WiFi configuration parameters are under each user's own control. The ISP is only applying those same parameters without modification to facilitate a better user experience for public WiFi service outside the home. Additional configurations may provide for implementation of per-user profiles for public WiFi service to enable a more granular range of services specific to each User In further detail, configurations herein provide a method of providing services to a wireless device by receiving an identity of a subscriber device by a public access point, and retrieving, based on the received identity, a wireless profile corresponding to a home access point, such that the wireless profile is stored in a remote database common to the public access point and the home access point. The public (i.e. remote) access point establishes a wireless connection to a service network based on authentication of the subscriber device using the retrieved wireless profile.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example configuration of a wireless device environment. The methods and apparatus depicted herein are presented in particular configurations for illustrating these methods and the apparatus on which they operate. A personal, or home, wireless access point is depicted along with a remote, or public wireless access point disposed in a commercial and/or shared location. Both are access points modeled according to the 802.11 capability outlined above, however the concepts illustrated may also applicable to other wireless mediums.

Figure 1:
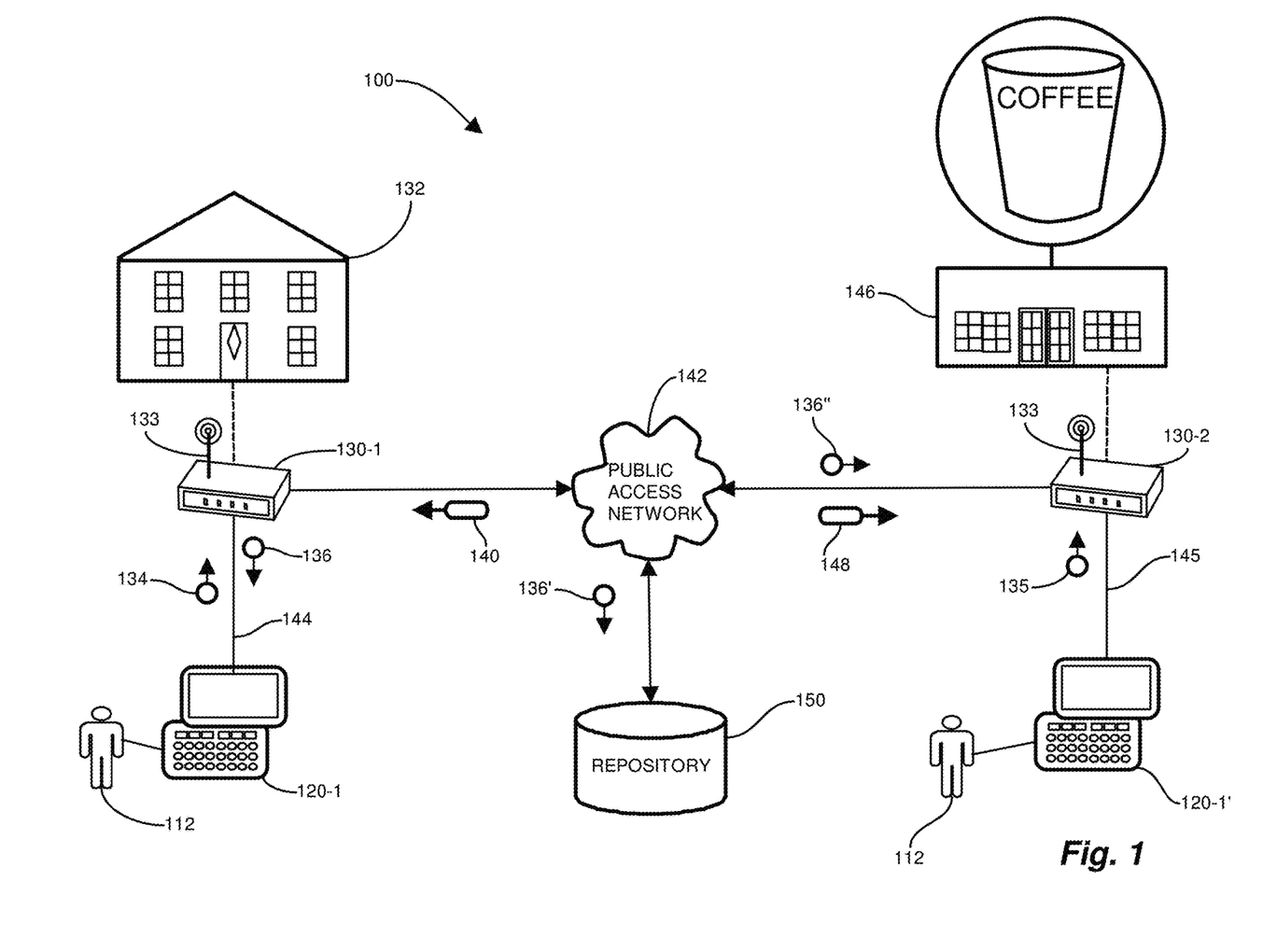
FIG. 1 is a context diagram of a wireless network suitable for use with configurations herein.

FIG. 1 is a context diagram of a wireless network suitable for use with configurations herein. Referring to FIG. 1, in a wireless device environment 100, users, or subscribers 112, employ a wireless device 120-1 via an access point 130-1 within the user's home or residence 132. The wireless device 120-1 receives wireless services 140, such as documents, audio, and/or video from a public or private access network 142 such as the Internet and/or local LANs (Local Area Networks) that directly or indirectly connect to the Internet.

Wireless devices within range of the access point 130-1, typically those within the residence 132, may establish a connection with the access point 130-1 for Internet access. More specifically, the wireless device 120-1 establishes a connection 144 to the access point 130-1 by sending a probe 134 indicative of the device 120-1 identity, such as a MAC (Media Access Control) ID to the access point 130-1 and any other access points within range. Each access point 130-1 has an antenna 133 for receipt of the probe 134, and responds with an SSID indicative of a wireless profile 136 of the access point 130-1 (an initial exchange may offer just the SSID and generate the wireless profile for future connections). The wireless profile 136 includes a security setting and a passphrase for allowing the user full access to the services 140 (i.e. Internet) via the access point 130-1. Accordingly, each time the subscriber 112 employs the subscriber device 120-1 to establish a connection 144 via the access point 130-1, they receive an invitation labeled with the SSID recognized as their "home" network with which to connect, and including any settings and/or defaults associated with the corresponding wireless profile. Since any access points 130 within range (i.e. neighbors, etc.) will respond to the probe 134 with an SSID, it is beneficial to be able to recognize the home SSID.

In the wireless device environment 100, however, subscribers frequently wish to invoke the wireless services 148 from a remote location 146 such as a coffee shop, hotel, or mass transit facility, for example. Conventional approaches to so-called wireless "hot spots" typically require the user to first identify the SSID of the remote location 146, and invoke a sign-on procedure, which may involve obtaining a password, paying a fee, and/or accepting a user agreement.

Further, such an arrangement leaves the subscriber 112 with the default profile of the remote location 146, which may differ from the settings and/or defaults that the subscriber 112 is accustomed to.

In redress, configurations herein provide a repository 150 of wireless profiles 136' for storing wireless profiles of a plurality of users based on MAC ID or other identifier, such that a remote access point 130-2 (130 generally) retrieves the wireless profile 136' corresponding to the "home" profile of the (now remote) subscriber device 120-1' (120 generally) and offers a sign-on using the same SSID label that the user is accustomed to from the remote location 146.

The repository 150, such as a wireless profile database, stores the wireless profile 136' employed by the subscriber device 120-1 for invoking the access point 130-1 in the residence 132. Upon proximity to a remote location 146, the remote (public) access point 130-2 receives the probe 135 of the remote subscriber device 120-1', and retrieves the stored wireless profile 136" using the MAC ID (or other device identifier) from the database 150. The subscriber device 120-1' is offered the SSID of the home profile for use at the remote location, and once selected, the retrieved wireless profile 136" is employed by the remote wireless access point 130-2 for providing wireless services 148 at the remote location 146.

Figure 2:
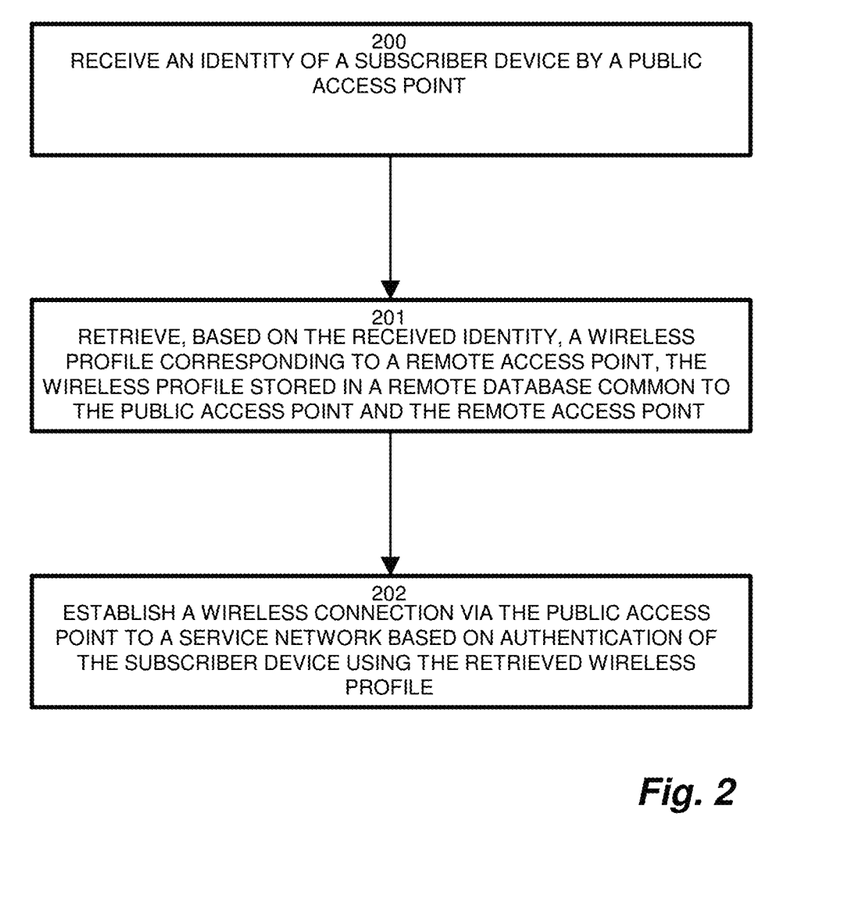
FIG. 2 is a flowchart of connection establishment in the network of FIG. 1.

FIG. 2 is a flowchart of connection establishment in the network of FIG. 1. In the wireless device environment 100, the method of providing services to a wireless device 120 as disclosed herein includes, at step 200, receiving an identity of a subscriber device 120 by a public access point 130-2, and retrieving, based on the received identity (via probe 135), a wireless profile 136" corresponding to the personal access point 130-1, in which the wireless profile 136' is stored in a remote database 150 common to the public access point 130-2 and the personal access point 130-1, as depicted at step 201. The subscriber device 120-1' establishes a wireless connection 145 via the public access point 130-2 to the service network 142 based on authentication of the subscriber device 120-1' using the retrieved wireless profile 136".

Figure 3:
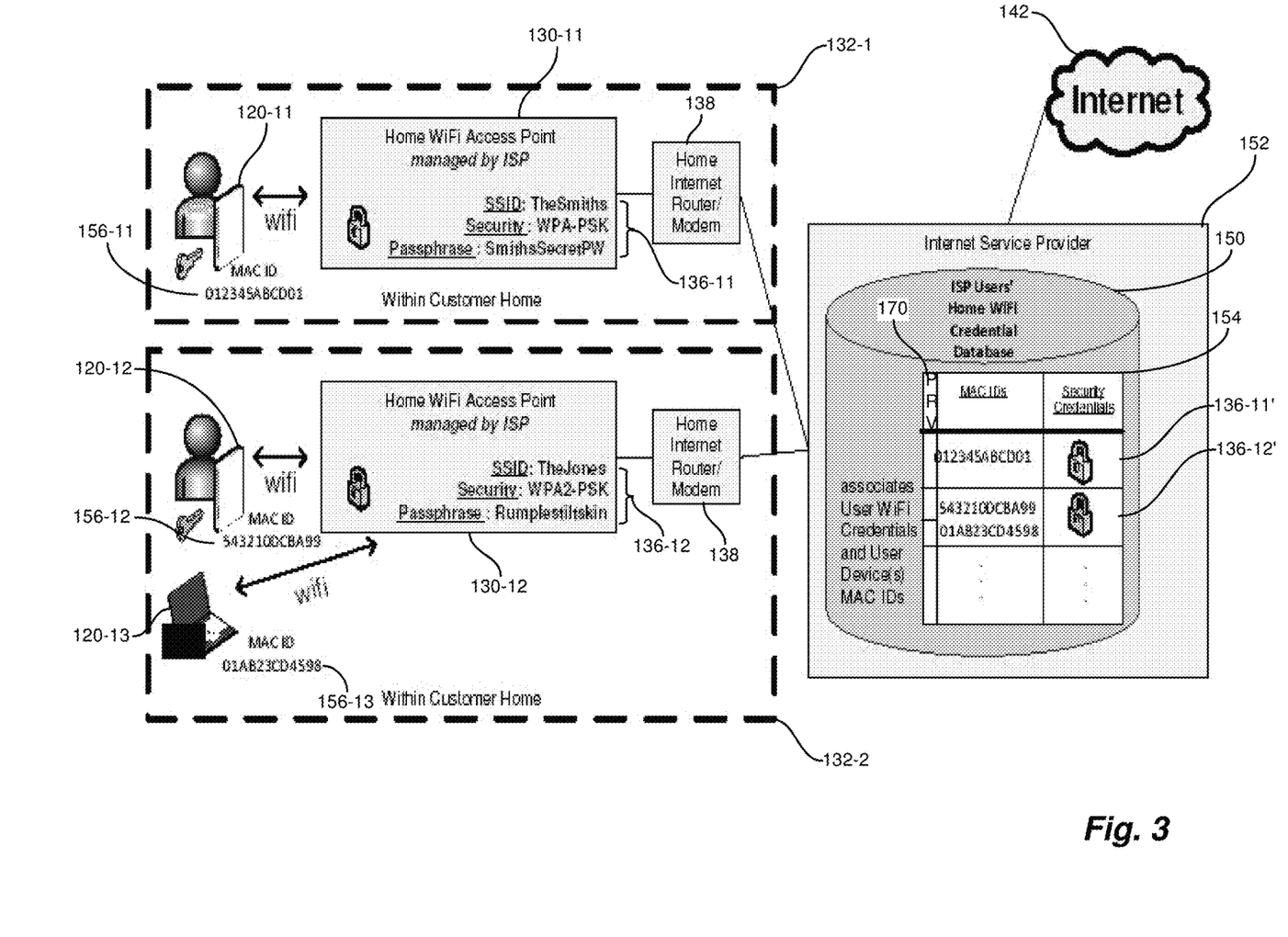
FIG. 3 is a block diagram of access points in the network of FIG. 1.

FIG. 3 is a block diagram of access points in the network of FIG. 1. Referring to FIGS. 1 and 3, a plurality of subscriber devices 120-11, 120-12, 120-13 are shown at residences 132-1, 132-2 (132 generally). Each residence 132 has a wireless access point 130-11, 130-12 including a wireless profile 136-11, 136-12 (136 generally) corresponding to the subscriber devices 120 served by the respective access points 130. An Internet service provider (ISP) 152 provides the wireless services 140 to each of the residences 132 via a home Internet router/modem 138 such as a cable modem or similar device (certain configurations may package the modem, routing and wireless access capabilities in a single device).

In the typical home WiFi network of FIG. 3, it should be noted that the access point 130-11, 130-12 broadcasts its SSID, and the user devices 120-11, 120-12, 120-13 can connect to that SSID successfully if it has the connect security parameters matching the parameters configured within the Home WiFi Access Point 130-11—SSID: The-Smiths, Security: WPA-PSK and Passphrase: SmithsSecretPW. These parameters are defined and configured by the home user and in conventional approaches are only stored locally within the access point 130.

The ISP 152 maintains the repository 150 including a table 154 of wireless profiles 136, including entries 136-11', corresponding to access point 130-11, and entry 136-12', corresponding to access point 130-12. The table 154 indexes the entries 136' by MAC IDs 156-11 . . . 156-13 of the respective devices, as shown by the devices served in the residences 132. A provisioned field 170 indicates if this is the initial invocation of the SSID for the device 120 corresponding to this MAC ID 156 from a remote access point 130-2, discussed further below.

Figure 4:
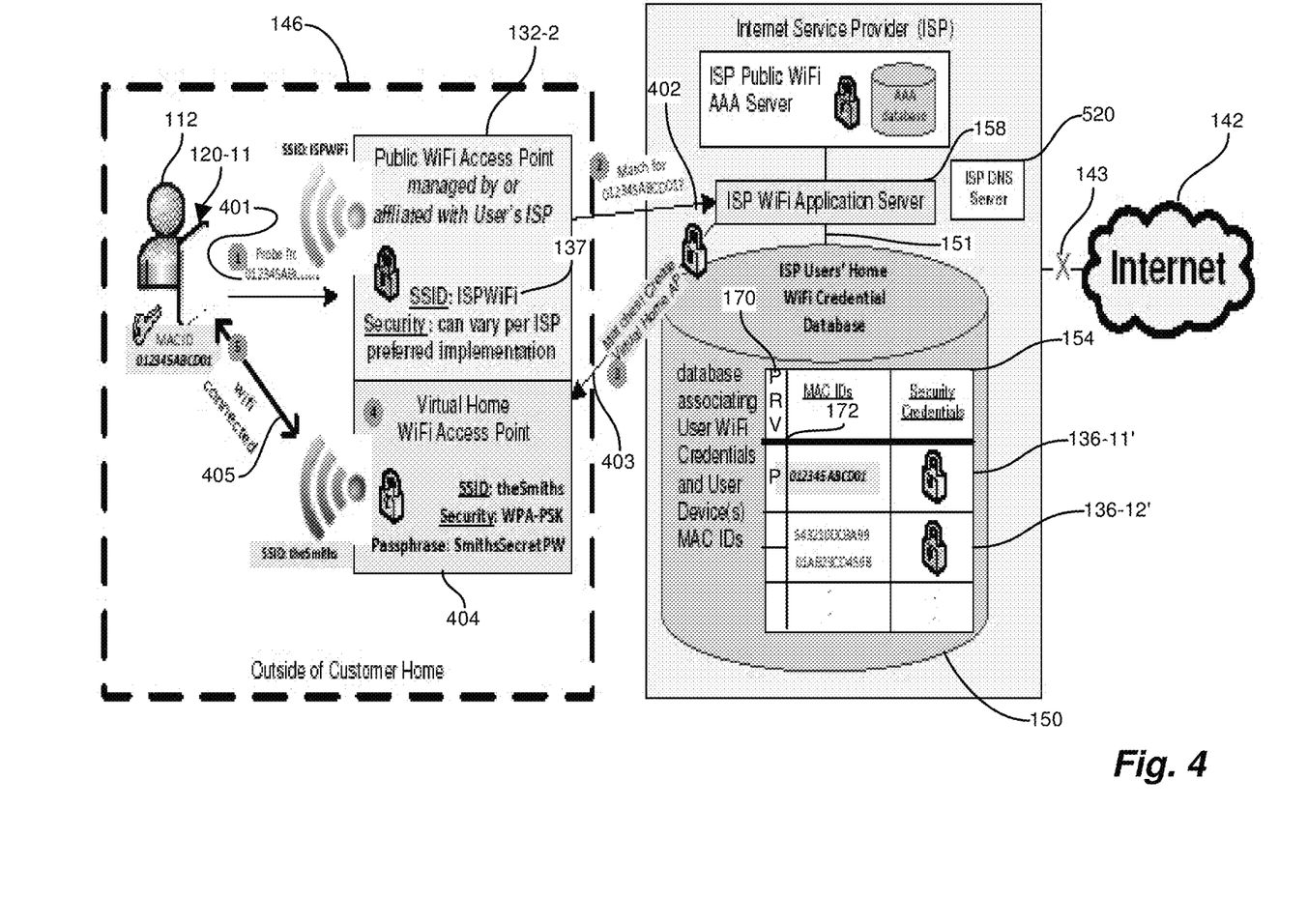
FIG. 4 shows an example of remote connection establishment as in FIG. 2.

FIG. 4 shows an example of remote connection establishment as in FIG. 2. Referring to FIGS. 1, 3 and 4, a subscriber 112 employs the subscriber device 120-11 with MAC ID 156-11 of '012345ABCD01' while attempting to access the Internet 142 at the remote location 146. The subscriber device 120-11 sends a probe 401 to the remote (public) wireless access point 130-2 bearing the MAC ID '012345ABCD01.' The remote wireless access point 130-2, configured for performing methods as disclosed herein, invokes an ISP WiFi application server 158 with a message 402 for a lookup in the profile table 154 for the MAC ID '012345ABCD01.' The WiFi application server 158, in the example arrangement, is operable as a wireless profile server for establishing, using the retrieved wireless profile 136", a wireless connection from the public access point 130-2 to the device 120, authenticating an identity of the device 120 using the wireless profile, and establishing a limited access connection via the public access point. The repository database 150 lookup finds a match on entry 136-11', and retrieves, via a credential device interface 151 the corresponding wireless profile 136-11 for returning to the remote access point 130-2, as shown by message 403. Upon receiving the wireless profile 136-11, the remote wireless access point 130-2 creates a virtual home WiFi access point 404 that emulates the SSID label normally encountered by the subscriber 112 from their home access point 130-11. Therefore, the subscriber device 120-11 will display an entry for the SSID 'TheSmiths" when displaying available SSIDs for connection from the remote location, in addition to the native SSID normally available such as "ISPWIFI" 137. The SSID corresponding to the wireless profile 136-11 is selected on the subscriber device 120-11, as shown by message 405, and an authentication exchange occurs according to the wireless profile 136-11, including the security (encryption) mechanism and passphrase normally used by the subscriber 112 at home. Additional authentication and/or MAC ID or other device validation may occur to ensure that other patrons in the remote location 146 are not also offered the 136-11 profile SSID and/or are not permitted to connect via the virtual home WiFi Access point 404.

Figure 5:
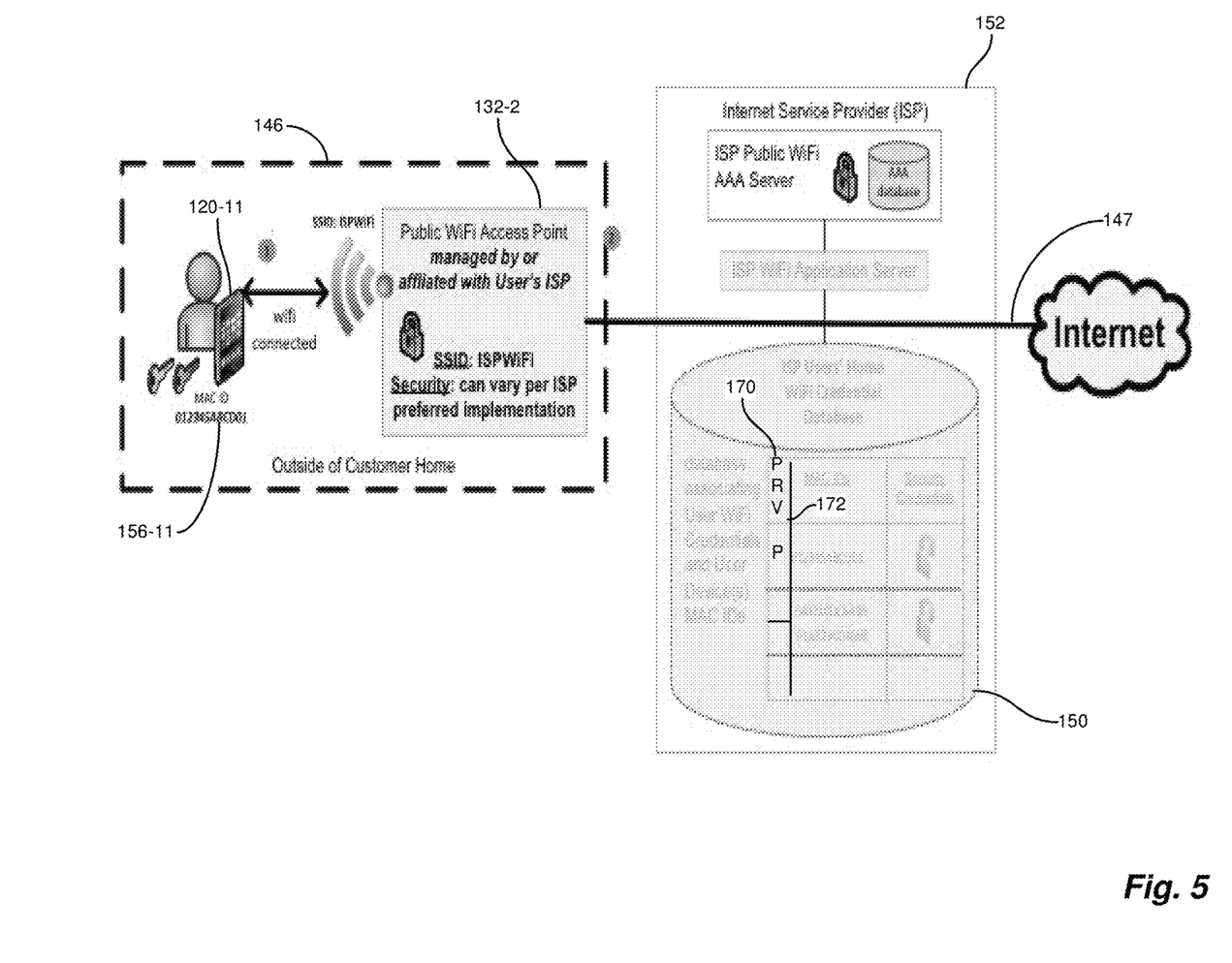
FIG. 5 shows an established connection as in FIG. 4.
Figure 6:
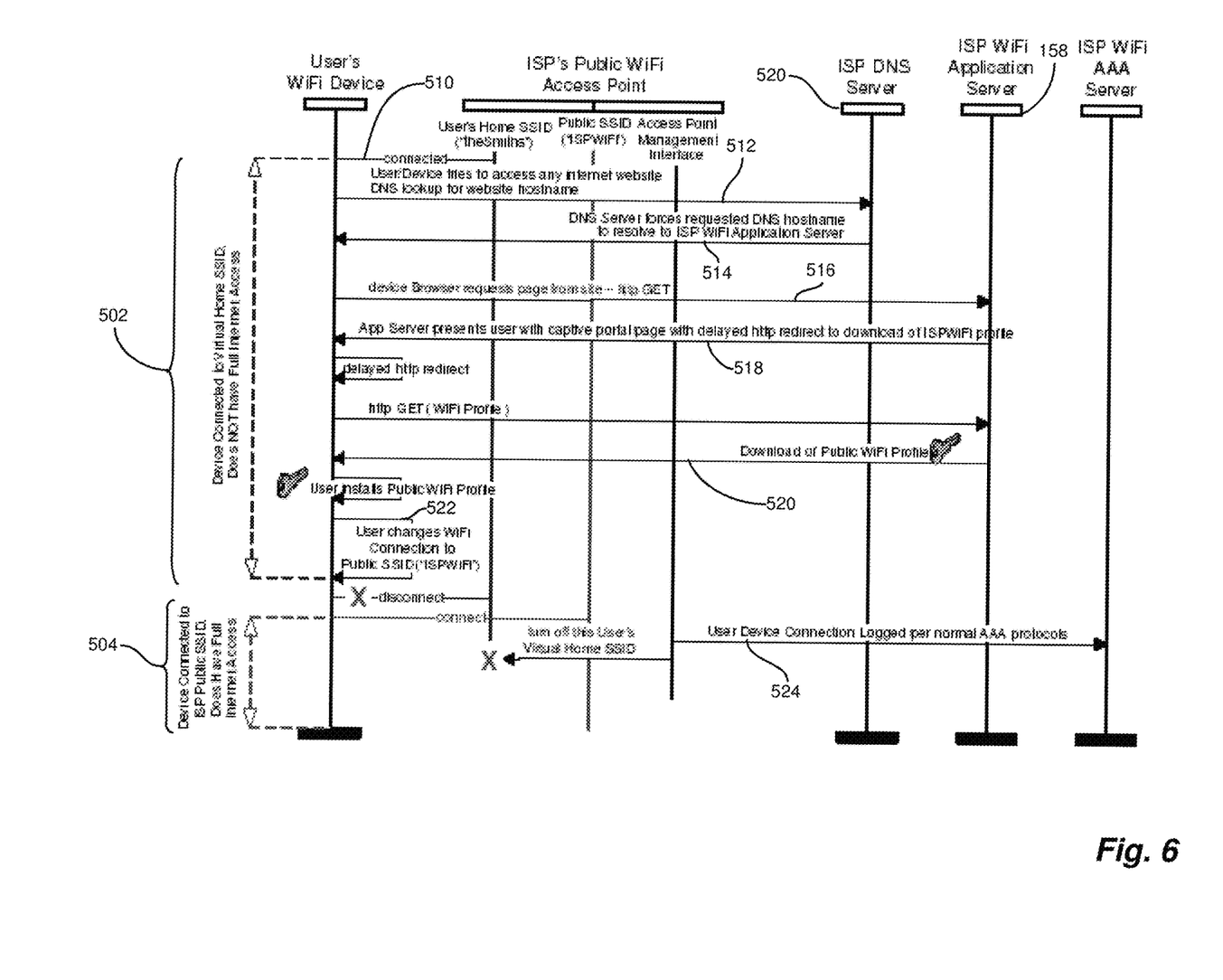
FIG. 6 shows a messaging sequence for the connection establishment of FIG. 4.

The provisioned field 170 is marked 172 for each MAC ID 156 upon successful connection of the subscriber device with MAC ID 156 to the full Internet 147, as triggered by a successful outcome of 524 in FIG. 6. Subsequent instances of the MAC ID 156 being within range of a remote access point 132 that recognizes the MAC ID 156 upon lookup will facilitate the exchange and avoid the virtual Home SSID 404 being broadcast by public access point 132-2. The recognized device 120 will automatically employ the SSID of the public access point 132-2 and be afforded a full Internet connection 147, as disclosed in FIG. 5 below.

Therefore, upon the second and subsequent remote wireless access point 130-2 invocations, the remote wireless access point 130-2 may automatically establish a connection to the subscriber device 120-11 upon detection and authentication using the Public WiFi SSID ("ISPWiFi" in FIG. 5) without yet again broadcasting the Virtual Home SSID 404 receivable by other wireless devices within range. Typically this may follow an initial exchange of credentials (i.e. passphrase) after which the subscriber device 120 would be automatically recognized. Once the authentication is established, the connection between the remote wireless access device 130-2 and the subscriber device 120-11 is broadened from the ISP to allow general Internet access, previously blocked by the ISP pending validation, as shown by the 'X' 143.

As shown in FIGS. 1 and 4, all WiFi devices send out probe 134, 135 requests to collect the SSIDs of all access points 130 that respond, and those probe requests include the MAC ID of the User's WiFi Device. Each user device, such as 120-11, 120-12, and 120-13 has a corresponding MAC ID that uniquely identifies the device, respectively 156-11, 156-12 and 156-13 in the example shown in FIG. 4. Continuing to refer to FIG. 4, the MAC ID 401 of this probe 135 (remote probe; 134 is a home access point 130-1 probe, however both contain similar information) acts as a trigger to create a virtual instance 404 of the user's home WiFi Access point alongside the public WiFi access point 130-2. This virtual home WiFi 404 will then cause the user's device 120 to automatically connect just the same as if the user 112 was in their home 132, creating a trusted connection over WiFi between the User's device and the ISP 152. The fact that this connection is trusted and specific to the user immediately upon its establishment is a significant improvement over traditional methods where WiFi Access Points typically broadcast an open SSID allowing any user's device to connect, and then must establish any trust later with each user using other means.

FIG. 5 shows an established connection as in FIG. 4. Once the user 112 is happily connected from at least one remote access point, as in FIG. 4, the ISP WiFi network ceases broadcasting the home AP profile 136-11 of this newly provisioned user's device every time it comes back onto the network. Accordingly, a provisioned flag 170 (field) is set 172 in the DB 150 for each device MAC ID 156 for whether is has already successfully connected to the Public SSID ("ISPWiFi" in this example).

For example, for a given user 112, they could invoke this feature one day with their iPhone® as documented and get connected. But then if they come back to the same Public AP with their iPhone the next day, their home SSID should never appear and they simply connect to the Public SSID ISPWiFi with the profile newly installed the day before. Yet if they come back with their iPad® on the third day, they should get the same experience they got with their iPhone on the first day assuming they used their iPad at home at least once already to get its MAC ID 156 counted in the ISP WiFi database, since both MAC IDs (devices 120) are associated with the same profile entry 136. This is beneficial because otherwise, the public access point 130-2 will be turning on the home SSIDs for users indefinitely even after they are fully provisioned.

FIG. 6 shows a messaging sequence for discovery and provisioning of the Public WiFi profile 522 after the Virtual Home SSID connection establishment of FIG. 4. Referring to FIGS. 4 and 5, the subscriber device 120-11 attempts to connect to the remote wireless access point 130-2, as shown by segment 510, commencing a first phase 502 during which the subscriber device 120 does not have full Internet access. An Internet connect request 512 from the subscriber device 120-11 triggers the relevant DNS server 520 to resolve the requested name, and reverts to the ISP application server 158, as shown at arrow 514. The subscriber device 120 executes an HTTP GET 516 with respect to the application server 158, and receives a captive page indicating redirection to a web server shown by arrow 518 that hosts the Public (e.g. "ISPWiFi") SSID wireless profile, which is provisioned via download to the subscriber device as shown by arrow 520. The user 112 completes any required authentication (i.e. passphrase entry) if required with the Public WiFi profile, and changes the connection to invoke the public wireless access point 130-2 for Internet access based on authentication and connection of their downloaded Public wireless profile as shown by arrow 522. The first phase connection 502 is then terminated in favor of a second phase connection 504 affording full Internet connectivity, which authenticates the new Public SSID connection by arrow 524.

Figure 7:
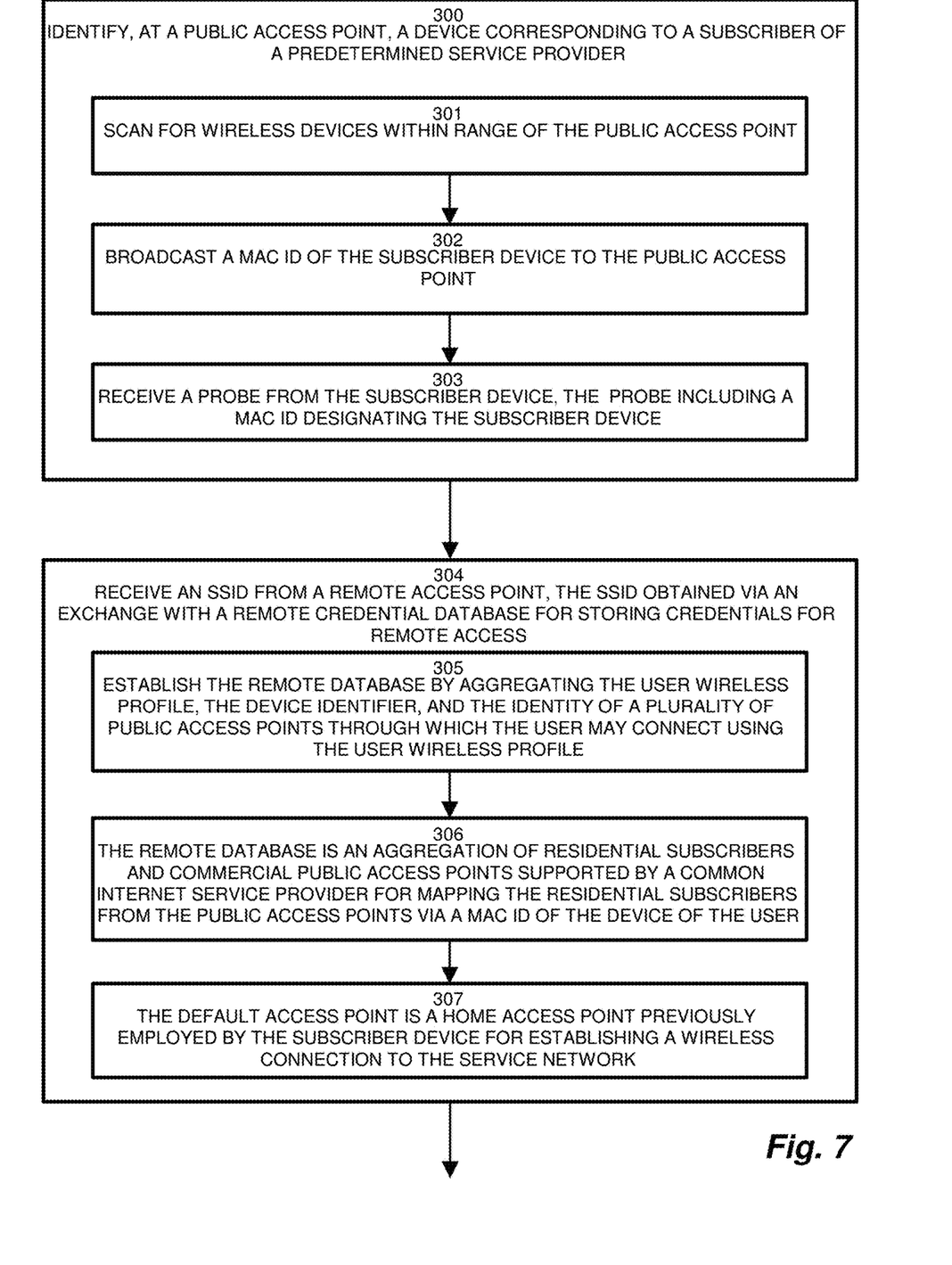
FIGS. 7-9 are a flowchart based on the messaging sequence of FIG. 6.
Figure 8:
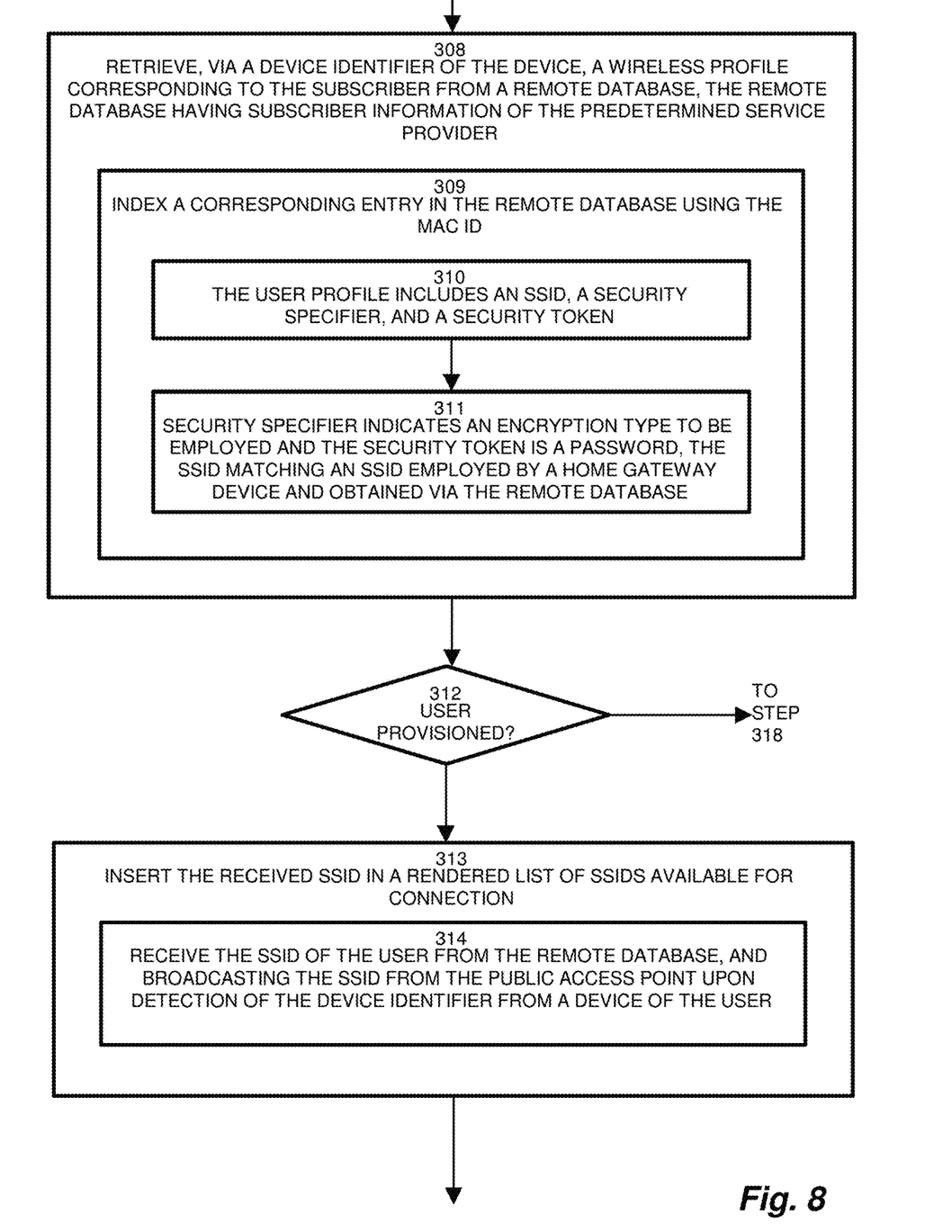
Figure 9:
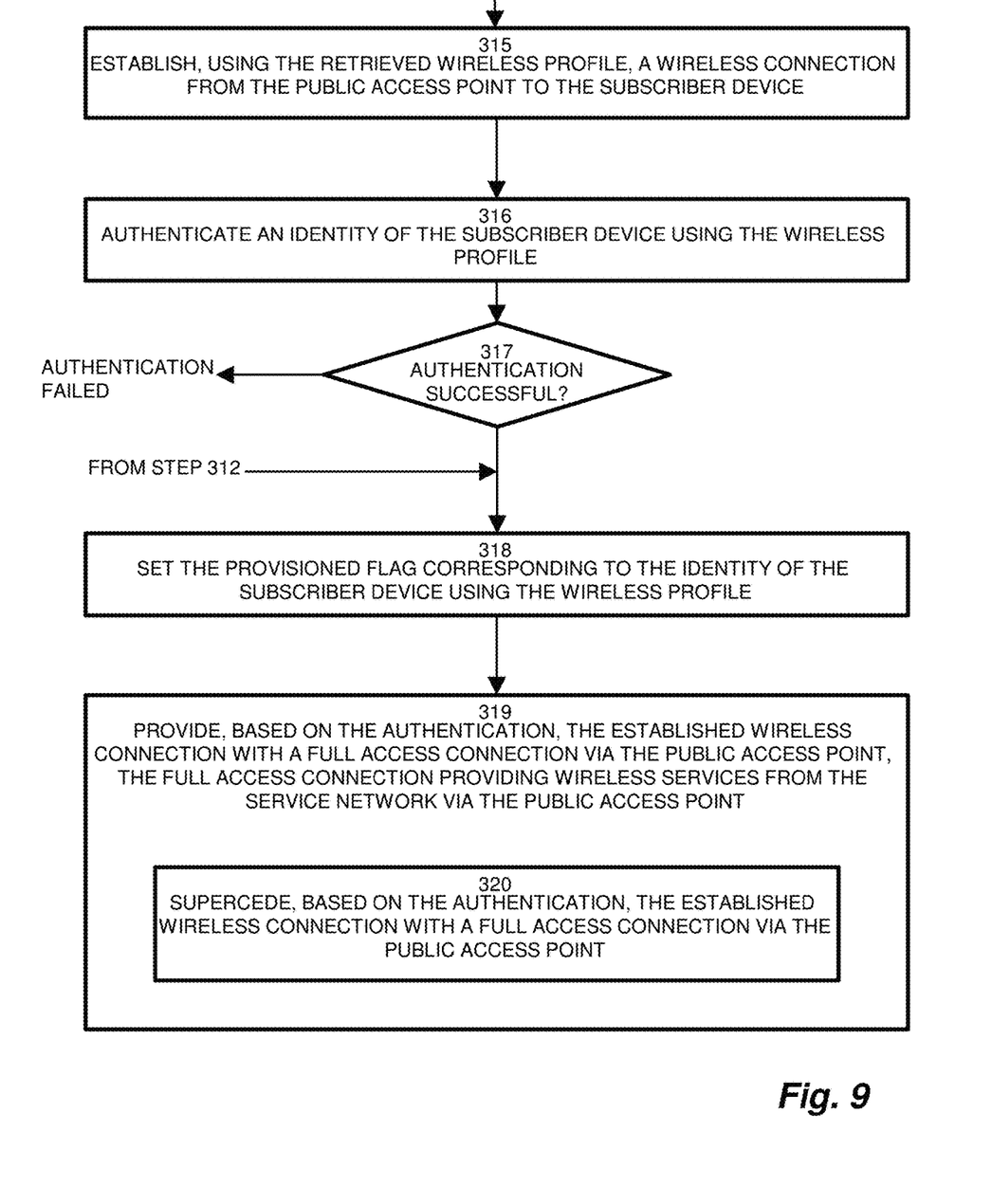

FIGS. 7-9 are a flowchart based on the messaging sequence of FIG. 6. Referring to FIGS. 1 and 4-8, at step 300, the public access point 130-2 identifies a device 120 corresponding to a subscriber 112 of a predetermined service provider 152. This includes scanning for wireless devices 120 within range of the public access point 130-2, as depicted at step 301. As is typical with wireless devices within range of an access point, the subscriber device 120-1' broadcasts a MAC ID of the subscriber device 120-1' to the public access point 130-2, as depicted at step 302, and the remote access point 130-2 receives the probe 135 from the subscriber device 120-1', as shown at step 303. In the example configuration, the probe 135 includes a MAC ID designating the subscriber device 130-2, however alternative device identifiers may be employed.

In response to the probe 135 (FIG. 1), the remote access point 130-2 receives an SSID based on the personal access point, in which the SSID is obtained via an exchange with a remote credential database 150 for storing credentials 136 for remote access, as depicted at step 304. This includes establishing the remote database 150 by aggregating the user wireless profile 136, the device identifier, and the identity of a plurality of public access points 130 through which the user may connect using the user wireless profile 136, as shown at step 305. In this manner, the remote database 150 is built from an aggregation of residential subscribers and commercial public access points 130 supported by a common Internet service provider 152 for mapping the residential subscribers from the public access points via a MAC ID of the device of the user 112, as depicted at step 306. In the example arrangement, the personal access point is a home access point 130-1 previously employed by the subscriber device 120-1 for establishing a wireless connection to the service network 142, as shown at step 307.

The ISP application server 158 retrieves, via a device identifier 401 of the device 120-1', a wireless profile 136 corresponding to the subscriber 112 from a remote database 150, in which the remote database 150 has subscriber information 136-11' of the predetermined service provider 152, as shown at step 308. This includes, at step 309 indexing a corresponding entry 136 in the remote database 150 using the MAC ID 401, in which the user profile 136-11 includes an SSID, a security specifier, and a security token, as depicted at step 310. In the example arrangement, the security specifier indicates an encryption type to be employed and the security token is a password, such that the SSID matches an SSID employed by the home (personal) wireless access device 130-1 and obtained via the remote database 150, as disclosed at step 311.

A check is performed, at step 312, to see if this device (MAC ID 156) has previously connected to the Public SSID—specifically if the provisioned field 170 is set 172, then the device has already been authenticated and control passes to step 319 to provide a full Internet connection to the user.

The remote access point 130-2 inserts the received SSID in a rendered list of SSIDs available for connection, as shown at step 313, for selection by a user. Typical subscriber devices render a list of available SSIDs detected within range of the subscriber device 120, along with an indication of signal strength. Without affirmative knowledge of the intended SSID for usage, users often need to employ signal strength as the SSID likely to correspond to the current location, and pursue trial and error methods to determine the proper SSID. This includes the remote access point 130-2 receiving the SSID of the user from the remote database 150, and broadcasting the SSID from the public access point upon detection of the device identifier from a device 120 of the user, as depicted at step 314.

The access point 130-2 then establishes, using the retrieved wireless profile 136", a wireless connection 145 from the public access point 130-2 to the subscriber device 120-11, as depicted at step 315 corresponding to Step 510 at the beginning of the first phase 502 of connectivity with only the ISP 152.

The virtual access point 404 authenticates an identity of the subscriber device 120-11 using the retrieved wireless profile 136-11 corresponding to the home wireless access point 130-1, and a check is performed at step 317 to determine if the authentication was successful. If the check was successful, then on the first connection from a particular device 120 (MAC ID 136), the provisioned flag 170 is set 172 so that subsequent connections from this device or another device associated with the profile 136-11' will be automatic.

The ISP application servers 520 and 158 then complete steps 512 to 520 to enable the user to install the Public WiFI Profile supporting the full access connection providing wireless services 148 from the service network 142 via the public access point 130-2, corresponding to phase 2 504, as depicted at step 319. This includes superseding, based on the authentication, the established wireless connection with a full access connection via the public access point 130-2, corresponding to removal of the 'X' 143 in FIG. 4, as shown at step 320. Further, the previously advertised SSID associated with the personal access point is turned off on the remote access point 130-2 such that it is no longer available for the subscriber device 120-1 that is now connected with full Internet access via the Public SSID now provisioned for that device in Phase 2 504.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a wireless network environment including users having wireless subscriber devices operable from home access points, and remote public access points responsive to the subscriber devices, a network repository device for storing wireless profiles, comprising:
   a repository for storing a plurality of wireless profiles, each wireless profile corresponding to a subscriber device of a user, the wireless profile indicative of network identifiers and settings applicable to a user experience for communication performed over the wireless network;
   an interface to the home access point, the interface responsive to a subscriber device for receiving a wireless profile of a user corresponding to the subscriber device; and
   an interface to a public access point, the public access point operable to provide wireless communication to the subscriber device according to the stored wireless profile, wherein the interface to the public access point is configured to:
      retrieve, from the repository, the wireless profile corresponding to the subscriber device;
      authenticate, based on the retrieved wireless profile, the subscriber device; and
      supersede, based on the authentication, an established wireless connection with a full access connection via the public access point.

2. The device of claim 1 wherein the interface to the public access point is configured to:
   establish a limited access wireless connection to the subscriber device; and
   supersede the limited access wireless connection with a full access wireless connection based on retrieval of the wireless profile.

3. The device of claim 2 wherein the interface to the public access point is responsive to
   receive an identity of the subscriber device of a subscriber by the public access point;
   retrieve, based on the received identity, the wireless profile corresponding to the subscriber from the repository; and
   transmit the retrieved wireless profile to the public access point.

4. The device of claim 2 wherein the wireless profile is based on a home access point previously employed by the subscriber device for establishing a wireless connection to a service network including the wireless network.

5. The device of claim 1 wherein the repository is a database having an aggregation of profiles of residential subscribers and commercial public access points supported by a common Internet service provider for mapping the residential subscribers from the public access points via a MAC ID of the subscriber device of the user.

6. The device of claim 1 wherein the wireless profile includes an SSID, a security specifier, and a security token.

7. The device of claim 6 wherein the security specifier indicates an encryption type to be employed and the security token is a password, the SSID matching an SSID employed by the home access point and obtained via the remote database.

8. The device of claim 1 wherein the interface to the public access point is operable to:
   broadcast a MAC ID of the subscriber device to the public access point;

obtain an SSID of the home access point, the SSID obtained based on the MAC ID via an exchange with the repository for storing credentials for remote access; and insert the received SSID in a rendered list of SSIDs available for connection via the public access point.

9. The device of claim 1 wherein the interface to the public access point is operable to:

receive results of a scan for wireless devices within range of the public access point;

responsive to the scan, receive a probe from the subscriber device, the probe including a MAC ID designating the subscriber device; and index a corresponding entry in the remote database using the MAC ID.

10. The device of claim 1 wherein the public access point is a first public access point, further comprising an interface to a second public access point, the first and second public access points configured to access the repository for retrieving the wireless profile of the user.

11. The device of claim 1 wherein the interface to the public access point is further operable to render the same SSID name from a plurality of different public access points based on the stored wireless profile.

* * * * *